Feb. 23, 1960    W. G. PFANN    2,926,075
CONTINUOUS ZONE REFINING USING CROSS-FLOW
Filed March 5, 1958    6 Sheets-Sheet 1

INVENTOR
W. G. PFANN
BY
ATTORNEY

Feb. 23, 1960  W. G. PFANN  2,926,075
CONTINUOUS ZONE REFINING USING CROSS-FLOW
Filed March 5, 1958  6 Sheets-Sheet 2

PARALLEL FEED

ANTI PARALLEL FEED

PARALLEL FEED

ANTI PARALLEL FEED

INVENTOR
W. G. PFANN
BY
ATTORNEY

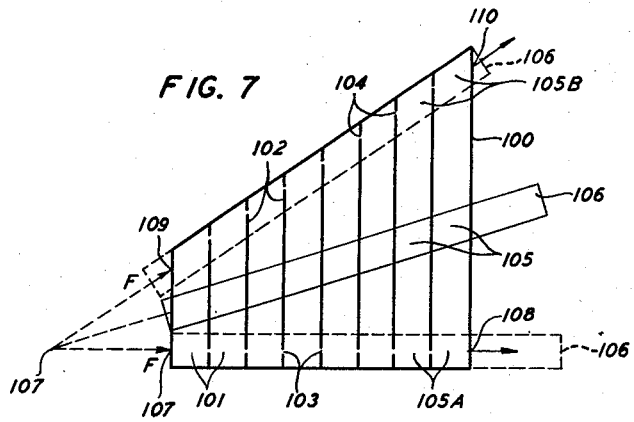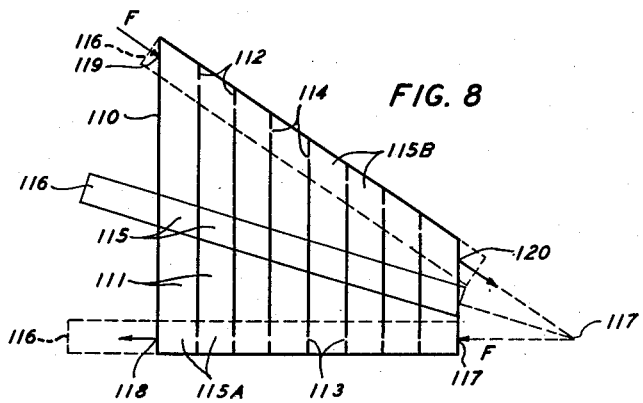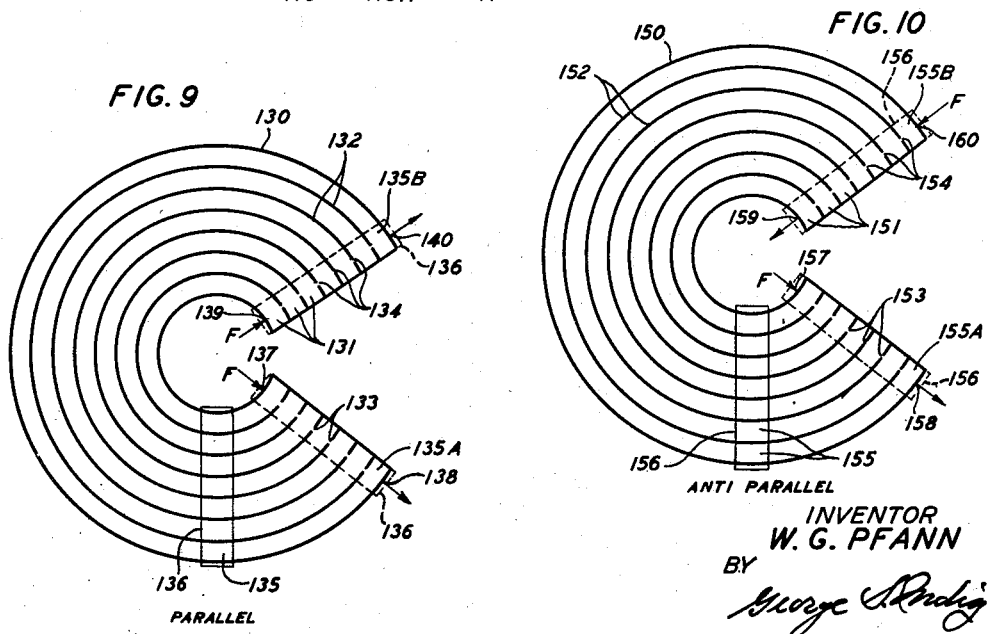

United States Patent Office 2,926,075
Patented Feb. 23, 1960

2,926,075

CONTINUOUS ZONE REFINING USING CROSS-FLOW

William G. Pfann, Far Hills, N.J., assignor to Bell Telephone Laboratories, Incorporated, New York, N.Y., a corporation of New York Application March 5, 1958, Serial No. 719,216

13 Claims. (Cl. 23—301)

This invention relates to processes for redistributing ingredients of fusible solute-solvent systems for the purpose of producing material of desired composition. The processes herein are continuous and make use of the zone-melting principles of United States Patent 2,739,088, issued March 20, 1956. In common with other zone-melting processes the processes herein utilize variations in solute solubility in adjacent solid and liquid phases in the material being treated to effect redistribution of such solute and may be applied to systems of metals and their alloys; to semiconducting elements and compounds; to salts and salt solutions, both organic and inorganic; and to other solute-solvent systems which can be caused to undergo a liquid-solid-liquid transformation.

The principles of and the universal applicability of the basic zone-melting processes are now well known to those skilled in the art. In the refining field alone, these processes have found application in the treatment of a broad range of materials including such diverse members as semiconductive materials, silicon and germanium, and salts such as potassium nitrate and gallium trichloride.

Although the zone-melting processes have found ever-increasing use in the treatment of a large class of materials, use to date has, to a large extent, been restricted to the batch forms of processing as described in the patent above cited. Such batch processes, although extremely useful especially in the preparation of relatively small amounts of valuable materials such as certain extrinsic semiconductive materials, are possessed of well-known limitations common to all batch operations. Widespread use of zone-melting in large quantity operations and in the treatment of many common materials has awaited the development of continuous procedures using such principles.

Continuous processes have certain well-known advantages as compared with batch operations. Where a distribution operation takes a considerable period to attain the desired end product compositions, as is frequently true of the zone-melting procedures, an advantage of continuous processing resides in the need for expending this starting period preliminary to steady state conditions only once, whereafter product flows are essentially instantaneous. Accordingly, and by reason of the elimination of the various cleaning out, charging up and other critical steps required in the attainment of steady state conditions, continuous processing may result in a substantial economy in apparatus cost and in manpower requirements, the latter both as to the number of attendants required for a given output and the necessary degree of technical competence.

The processes of this invention in being continuous and in being susceptible of automatic operation once the steady state conditions have been attained, are inherently possessed of the advantages set forth. In addition, the zone-melting procedures of this invention make feasible certain operations which may not easily be carried out in a batch process. For example, a solvent material C may be added to a binary AB solvent-solute system as part of a continuous feed composition to result in improved separation in accordance with the "salting out" principle. In batch operation, addition of such a solvent material would usually be required at the initial position of each zone prior to its traversal of the material under treatment.

The development of suitable continuous procedures for zone-refining has not been without difficulty. The non-compressibility of both phases, solid and liquid, present in zone-melting and the tendency of the solid phase to adhere to the container walls has complicated the superimposition of material flow upon zone movement. Unlike distillation, in which feed material may, without difficulty, be introduced at any position in a column, its volume being accommodated by a combination of movement of the liquid phase along the column and by compression of the vapor phase within the column, in zone-melting it has generally been considered necessary to artificially provide for the additional volume of feed material.

Such accommodation first took the form of moving crucible walls, carrying adhering solid phase material, together with counter-current reflux flow in the form of a continuous liquid stream maintained in intimate contact with such solid phase material; see United States Patent 2,739,046. Another continuous procedure known as "zone void melting" made use of the deliberate introduction of voids or "void materials" at each exit position, such voids being filled or displaced by feed material at some other position in the column; see United States Patent 2,739,045. These and other subsequently developed continuous procedures for zone-melting, at least in their fundamental embodiments, have certain characteristics in common: They make use of a single feed position, generally intermediate to product ports, and they include a material transport mechanism by which matter is carried along a "column" in the same direction as, or opposite to, that of zonal traversal.

The processes of the instant invention represent a new approach to continuous zone-melting in that they make use of two or more separate feed positions and in that a deliberately provided transport mechanism results in material transport in a direction, not along, but across, the "column." These processes are possessed of certain unique advantages as compared with other continuous zone-melting procedures.

In essence, the processes of this invention make use of the movement of two or more molten zones following distinct, generally parallel, paths through a body or bodies of solid material. These traversal paths are physically separated over their entireties, provision however being made for cross-flow of liquid material between zones at at least two positions generally corresponding with the two termini measured in the direction of traversal. At scheduled times, as molten zone position corresponds with the position of cross-flow, feed is introduced into a first zone and product is withdrawn from another corresponding zone, product withdrawal being effective by cross-flow transverse to the direction of zonal traversal upon the introduction of feed material.

These processes which are referred to herein as cross-flow zone-melting may make use of any number of corresponding zones of fixed or variable length passing through separated bodies. Use of any of these procedures results in the continuous withdrawal of at least two exit compositions having a desired concentration of solute or solutes. Variations of the fundamental process which are particularly applicable to certain types of systems and given redistribution requirements are described herein. Such variations may provide for the removal of three or more exit compositions, parallel or antiparallel feed flows, variable length parallel bodies or zones, and straight or annular apparatus configurations. Also described are various heater and baffle configurations making for the minimization of thermal gradients and concentration gradients at critical positions within the apparatus.

Although the invention is described primarily in terms of "zone refining" or "zone refiners" and in terms of solid bodies of material undergoing treatment, it is to be understood that, in common with other zone-melting procedures, objectives may include additions of certain ingredients and may operate, at least in the setting-up period, by the traversal of granular or solid material other than the continuous solid phase generally inferred from the use of the term "body." For simplicity, discussion is generally in terms of resulting product and waste flows, although it should be understood that either or both exit materials may be of desirable composition for given objectives. In common with other zone-melting processes, it is required only that one or more solute materials of interest have a distribution coefficient unequal to unity at a solid-liquid interface between such phases in equilibrium. Whether such distribution coefficient, here designated by the symbol $k$, be greater or less than 1, or whether it be due primarily or in part to the addition of solvent material not originally present in the material to be processed, is of interest only in the design of the apparatus in which these processes are to be carried out.

An important characteristic of cross-flow zone-melting is that this process permits the continuous removal of waste and product having a separation equal to or greater than that for a batch zone refiner of the same number of zone lengths. In distillation terminology, it might be said that such a column operating at partial reflux exhibits a degree of separation equal to or greater than that ordinarily attainable only at total reflux. An understanding of this and other characteristics of these processes will be facilitated by reference to the attached drawings in which:

Fig. 7 is a schematic plan view illustrating a parallel feed cross-flow operation as carried out in refining apparatus having variable section length.

Fig. 8 is a schematic plan view depicting anti-parallel feed flows in a variable section length refiner;

Fig. 9 is a schematic plan view depicting a two-product parallel feed cross-flow refining operation as carried out in an annular refiner;

Fig. 10 is a schematic plan view illustrating anti-parallel feed flow in such a two-product annular operation;

Figure 13:
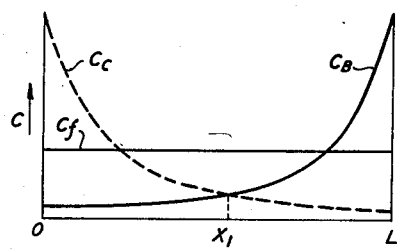
Figure 14A:
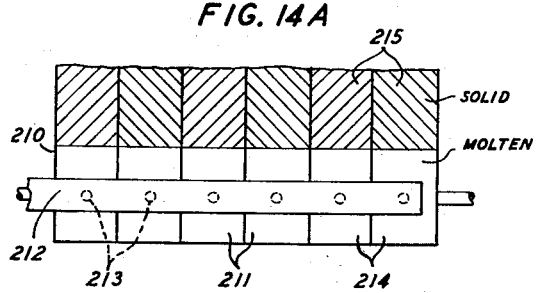
Figure 14B:
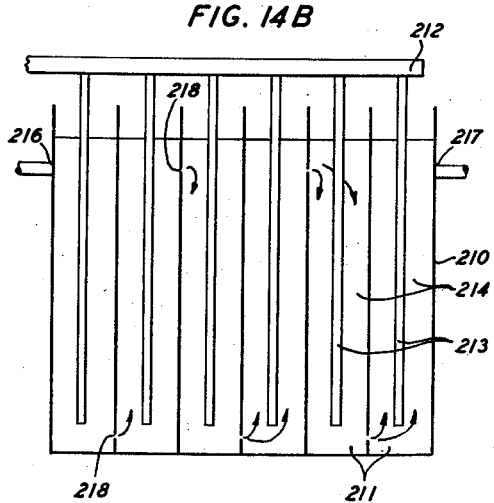
Figure 15:
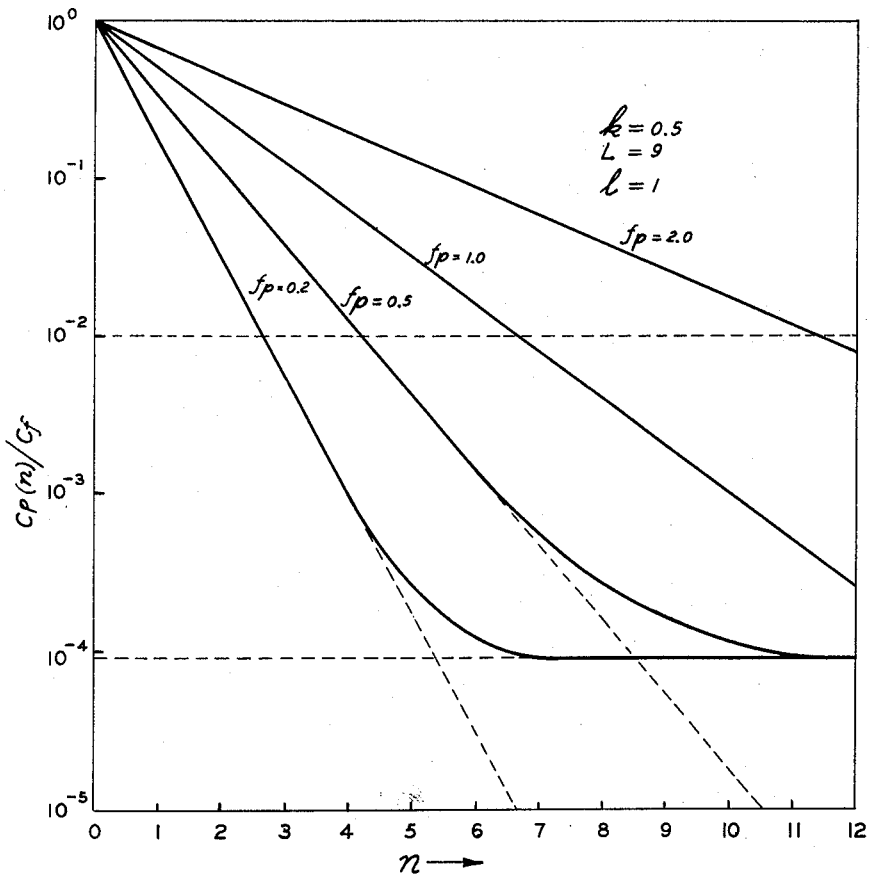
Figure 16:
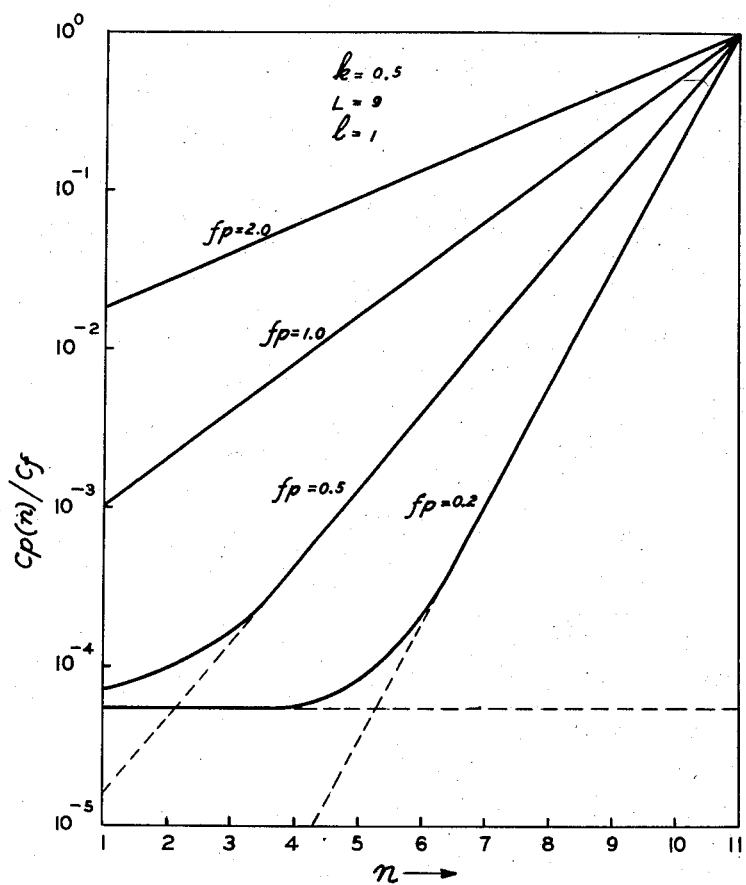

Fig. 13 on coordinates of solute concentration and section length in zone lengths is a plot showing the variation in the concentrations of two solutes in a three-product refining operation and illustrates the feasibility of withdrawing an intermediate product having an individual or combined solute concentration less than that of product, waste or feed composition;

Figs. 14A and 14B are plan and front elevational views, in section, showing an apparatus variation useful in a cross-flow process having zones of large volume;

Fig. 15 is a semilog plot of the logarithm of the relative product concentration versus the section number for the parallel mode of operation to which reference will be made in the illustrative calculations herein; and Fig. 16 is the semilog plot on coordinates of log relative product concentration versus section number for the antiparallel mode to which reference will be made in the illustrative calculations.

Referring again to Fig. 1, there is depicted a typical basic dual-feed cross-flow refining operation. The apparatus shown includes a closed receptacle 1 which may have a removable lid 2 made of a suitable refractory material such as quartz, glass, graphite or other metallic or non-metallic material depending upon the melting point and chemical reactivity of the system undergoing treatment, having ports 3, 4, 5 and 6 and containing partitions 7 through 13, each having two orifices 14 and 15. A closely fitting heater 16 which may be supplied with a resistance heating element deriving power from source not shown and arranged so as to be movable with respect to receptacle 1, is used to create and to move molten zones 19 within receptacle 1. Material 17 undergoing treatment having solid phases 18 and molten phases 19 is shown in the steady state condition. This refiner has eight separate sections 20 through 27 completely separated from each other by partitions 7 through 13, except for the regions of orifices 14 and 15. In operation, heater 16 melts corresponding portions of solid material 17 in each of refiners 20 through 27, thereby producing molten zones 19. Moving heater 16 from the position shown to that of the opposite end of receptacle 1 results in a corresponding movement of molten zones 19 from the position shown to one corresponding with orifices 15.

With molten zones 19 as shown, feed material is introduced through a port, such as port 3, by means not shown and product or waste is withdrawn through a port, such as port 4, in a volume generally equal to that of the feed introduced. Orifices 14 may be one-way valves permitting liquid flow only in the desired cross-flow direction or may, more simply, be so restricted in size as to permit virtually no section-to-section flow except under flow conditions created by the forced addition of feed through port 3. When molten zones 19 reach their terminal position corresponding with orifices 15, more feed material is introduced. For a parallel feed flow refining procedure, such introduction is through port 5, waste or product withdrawal being through port 6. For anti-parallel conditions, the flow is reversed with feed entering through port 6 and waste or product being withdrawn through port 5. The optimum amounts of feed introduced at either end of the refiner may not be equal and are significant parameters which, considered in conjunction with other factors, determine the product and waste compositions and flow rates. Such considerations are discussed in detail herein.

Figure 1:
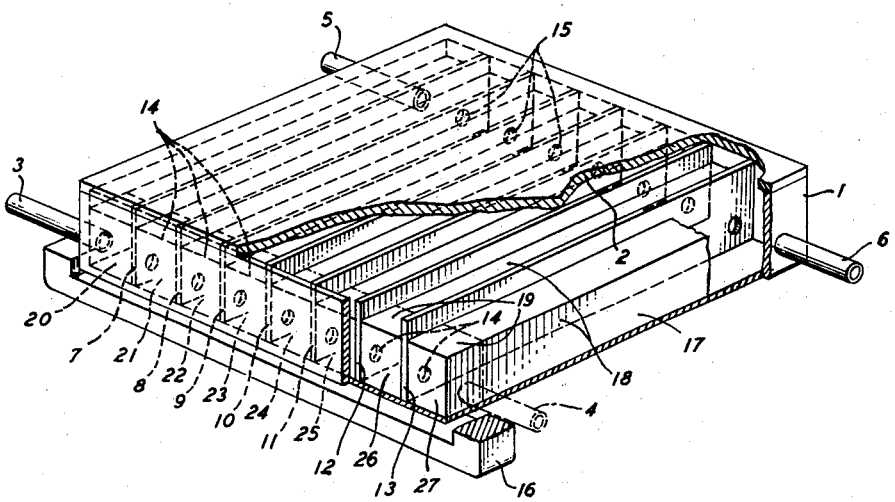
Fig. 1 is a perspective view, partly in section, of a two-product cross-flow zone refiner in operation.

For the purpose of the description of Fig. 1, it is sufficient to note that the general effect of material cross-flow is to remove a certain amount of treated material from, for example, refiner 20 and to insert it in the initial zone position of refiner 21 and so on. The general effect of such cross-flow is to result in a concentration gradient in the direction of flow from inlet port 3 to outlet port 4. Except for special conditions which are mentioned, the maximum amount of feed introduced and of product or waste withdrawn for each pass at each end of the refiner is equal to one zone volume, since any further addition has the effect of partially or completely short-circuiting one or more refiner sections. Comparative results obtained by the use of parallel and antiparallel flows are discussed in connection with Figs. 3 through 6.

Where orifices 14 are simple apertures as depicted, it is desirable to minimize back flow (flow in a direction opposite to that of feed to withdrawal flow) by feeding in at a rate such that there is continual cross-flow through orifices 14 during the entire period that they are contacted by molten zones 19. The section efficiency of a cross-flow operation is, like other zone-melting operations, to some extent dependent upon the degree of mixing within each successive molten zone 19, during traversal. As is described in United States Patent 2,739,088, above cited, the more complete is the mixing of molten material within a traversing zone, the more nearly is the theoretical value of the distribution coefficient, $k$, approached. Some stirring of course results from natural convection currents and may be augmented by mechanical agitators, electrically induced currents and by other means known to the art.

Other considerations apply during actual cross-flow with zones 19 at orifices 14 or 15. Here it is desired to move material processed in section 20 to section 21, material processed in 21 to 22, and so forth. Since mixing within sections results in a certain amount of material movement into and through a section as from 20 through 21 to 22, thereby removing a stage of processing, e.g., 21, so far as that amount is concerned, desired cross-flow is "plug-like" with a minimization of mixing in each stage. Whereas cross-flow movement of a small fraction of the volume of a zone presents little difficulty in this respect, movement of amounts of material approaching a zone volume may require additional mechanical expedients as, for example, baffles to ensure smooth flow and minimize turbulence, and others which are noted herein.

The material level shown in Fig. 1 as approximately two-thirds of the inner height of receptacle 1 is illustrative only. The degree of fill is, of course, determined by practical considerations such as the percentage of volume change between liquid and solid phases and the amount of pressure that can be safely withstood by the apparatus.

The maximum size of the apparatus 1 as well as the limiting dimensions of the molten zones 19 are determined chiefly in view of heat transfer conditions. The single-sided heater 16 depicted in Fig. 1 is most suitable for comparatively low-melting materials. Assuming no substantial heating over that portion of the apparatus 1 corresponding with solid portions of material 18, for high-melting materials, a large temperature gradient between the melting point of the material 17 and that of the solid portions 18, results in some difficulty in maintaining regular molten zones 19 which are liquid from their lowermost to their uppermost surfaces. Illustrative materials which may conveniently be processed in the apparatus of Fig. 1 are lead and naphthalene. Illustrative dimensions for a refiner bank 1 suitable for the treatment of such material may be 12 inches by 12 inches square by 3 inches high. A suitable container material for such use is stainless steel.

Figure 2:
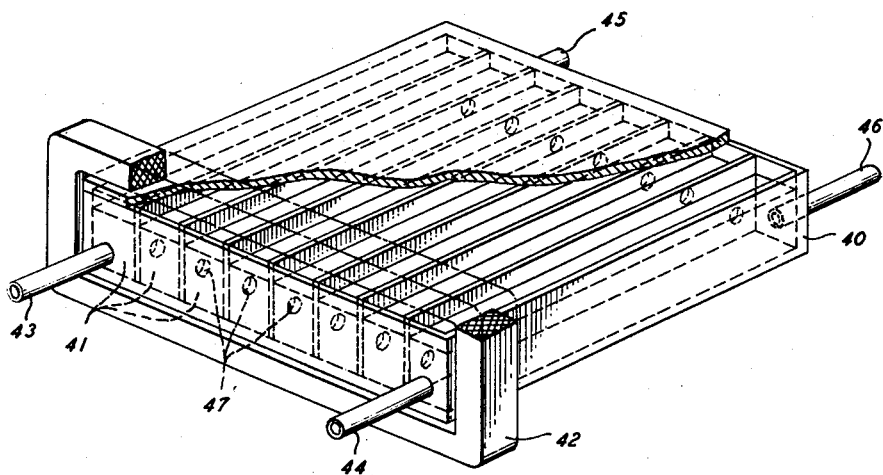
Fig. 2 is a perspective view of an alternate form of a two-product cross-flow zone refiner.

Fig. 2 depicts a refiner 40 having the same number of sections 41 as that of Fig. 1. This refiner is, however, provided with a closely-fitting encompassing heating ring 42 which may be a direct or indirect RF heater to which electrical power or heat is applied by means not shown. To avoid obstructing heater movement ports 43, 44, 45 and 46 are positioned in line with molten zone movement. It should, however, be kept in mind that these ports correspond successively with ports 3, 4, 5 and 6 of Fig. 1 with cross-flow between sections 41 being brought about through orifices 47 in a direction transverse to zonal traversal. Such a heater configuration as that shown in Fig. 2 is more suitable for the processing of higher melting materials, such as most common extrinsic semiconductors and metals. For the processing of germanium apparatus 40 may be made of graphite and may have dimensions identical to those set forth in Fig. 1.

Figure 3:
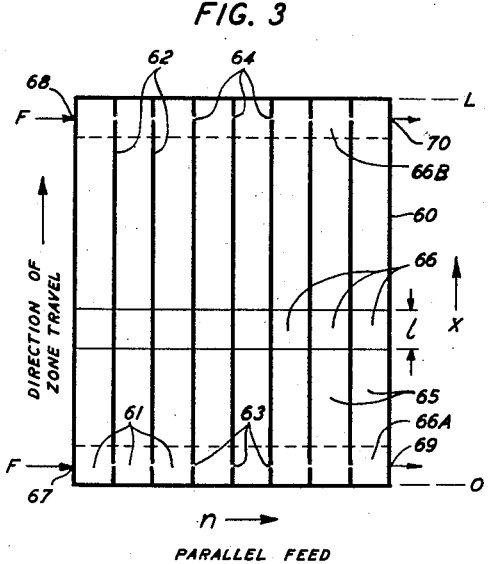
Fig. 3 is a diagrammatic plan view depicting an eight-section parallel feed cross-flow zone refining operation.

Fig. 3 is a schematic view of a process such as that depicted in Fig. 1 using the parallel feed mode. In this figure, rectangular vessel 60 is divided into eight refining sections 61 by longitudinal partitions 62 having orifices 63 and 64, but otherwise completely separating refining sections 61 each from the other. In steady state operation, material 65 undergoing treatment is contained in each of refining sections 61 throughout its entire length. Molten zones 66 are produced by heaters not shown which may, for example, be of the configuration of heater 16 or 42 of Figs. 1 and 2, respectively. Such zones of length $l$ in the direction of the longitudinal axis of successive refiners 61 are moved from initial position 66A along the refiners to terminal position 66B. It is essential to the process that there be a continuous liquid flow path or other provision for material transport across all of the refiner sections at both positions 66A and 66B. This is conveniently accomplished by using a single heater to produce the entire bank of zones as described.

In Fig. 3, feed material enters at the left side of the refiner in two streams 67 and 68 at the beginning and end of the refiner successively, feed entering at 67 with molten zones at position 66A and at 68 with molten zones at position 66B. Treated materials are withdrawn at 69 and at 70 corresponding in time sequence and amount with feed introductions at 67 and 68, respectively.

For simplification, this section of the discussion is in terms of a binary solute-solvent system in which the solute has a distribution coefficient $k$ of less than 1. $k$ is defined as the solute concentration in the freezing solid phase divided by the solute concentration in the liquid phase. It is further assumed that the desired end product is pure solvent material and that the solute-enriched portion is to be treated as waste. Under these circumstances, material flow at position 69 is regarded as product, P, and material flow at position 70 is regarded as waste, W.

As the two streams initiating in positions 67 and 68 travel across the refiner 60 at each end, molten zones 66 travel in an upward direction as depicted, removing impurity from the lower stream 67—69 and depositing it in the upper stream 68—70. When the zones are at $x=0$ or position 66A, a volume of feed is introduced into the first refining section through a port at position 67. This forces an equal volume to flow through successive refining sections 61 and finally in the withdrawal of an equal volume of product P through port 69. Zonal movement along the refiner forms the redistribution characteristic of zone refining operations; see United States Patent 2,739,088. When zones 66 reach position 66B at $x=L-l$, where $l=$zone length and $L=$refiner length, feed is injected into first refiner section 61 through port 68, causing cross-flow through orifices 64 in partitions 62 and ultimately in the withdrawal of an equal volume of waste W through port 70 from last refining section 61.

As has been described, by the use of restricted orifices 63 and 64 advantageously aided by flow conditions resulting in cross-flow during the entirety of the period that such orifices are in contact with molten material, or by the use of narrow tube connections or one-way valves, mixing of the contents of adjacent zones 66 in successive refining sections 61 is prevented except in the flow direction of streams 67—69 and 68—70. The ratio of the volume transferred from section to section to the total volume contained in a molten zone 66 is designated $f$. This fraction is, in turn, equal to the ratio of feed volume to zone volume for constant zone volume design. Fraction $f$ may vary from a very low value to 1.0 and is commonly equal to such maximum value. As is described herein, under certain circumstances, $f$ may be caused to exceed 1 without resulting in short-circuting of any of the refiner sections 61.

Figure 4:
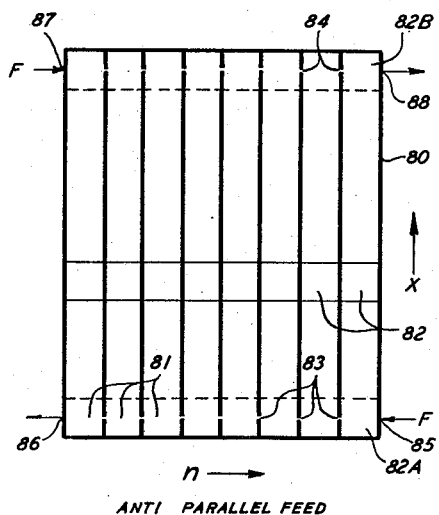
Fig. 4 is a diagrammatic plan view depicting an anti-parallel feed cross-flow zone refining operation.

Fig. 4 shows a refiner 80 having eight refining sections 81 and otherwise of a configuration identical to refiner 60 of Fig. 3. As depicted, the refiner is operating under steady state conditions with molten zones 82 moving upwardly as shown from initial position 82A corresponding with orifices 83 to terminal position 82B corresponding with orifices 84. The particular mode of feed operation shown is, however, antiparallel with feed being introduced at position 85 on the right end of the refiner and product being withdrawn from port 86 at the left end of the refiner when zones 82 are at position 82A, and second feed stream proceeding from left to right from feed port 87 to waste port 88 with zones 82 at position 82B. As described herein, this mode of operation permits greater separation for a given length and width of refiner than is obtained with parallel flow.

Although Figs. 3 and 4 have been described in terms of intermittent feed, product and waste flows occurring only upon the coinciding of moving zones with such positions, either figure may be considered to be descriptive of an alternate mode of operation. In accordance with such alternate process, zonal positions 66A, 66B, 82A and 82B may be considered to be molten at all times so that corresponding cross-flow is continuous.

Assuming equal volume flows for either mode of operation, intermittent or continuous, although continuous operation leads to a small cyclic variation in output concentrations, the average concentration in product and waste does not differ significantly from the intermittent mode. The description herein is in terms of the intermittent mode of operation.

The following is a discussion of separation theory in terms of first parallel and then antiparallel feeds for rectilinear constant-volume and constant-section lengths for refiners such as those depicted in Figs. 1 through 4. This theoretical section is followed by a general description of alternate refiner configurations and by specific examples.

Separation theory

Consider a parallel flow refiner like Fig. 1 and a binary system for which $k$ is less than 1. Denote by $C_{p(n)}$ and $C_{w(n)}$ the concentrations of solute in the liquids leaving the $n$th section, where sub-p denotes product and sub-w denotes waste. Consider a refiner of length $L$ and zone length $l$, having a very large number, $n$, of sections.

Figure 5:
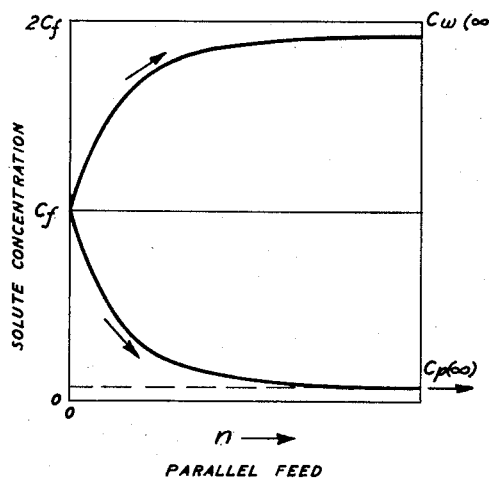
Fig. 5 is a plot, on coordinates of solute concentration and number of sections in the cross-flow direction, showing approximate curves of solute concentration in the liquids at the product and waste ends of the refiner in a given section for a parallel feed operation.

Plots of the concentrations, $C_{p(n)}$ and $C_{w(n)}$, for such a refiner in the steady operating state as a function of $n$ are shown in Fig. 5. (The fact that an abscissa $n=0$ is shown denotes that the feed source, whose composition is $C_f$, can be regarded as the $n=0$ section.)

The curves are symmetrical about the line $C_f$=constant and approach certain limits asymptotically. The equation for the product curve, designated $C_{p(n)}$ is:

$$C_{p(n)}/C_f = G^n + C_p(\infty)/C_f \qquad (1)$$

where $$G = \frac{f_p}{f_p + \left(\frac{1}{k} - 1\right)} \qquad (2)$$

in which $f_p$ is the fraction of the zone volume in one section (at the beginning of the refiner), which is transferred each cycle.

The equation for the waste curve is obtained from the overall solute balance:

$$(f_p + f_w)C_f = f_p C_{p(n)} + f_w C_{w(n)} \qquad (3)$$

where $f_w$ denotes fraction transferred at end of refiner. From (3) and (1):

$$C_{w(n)}/C_f = \frac{f_p + f_w}{f_w} - \frac{f_p}{f_w}\left(G^n + \frac{C_p(\infty)}{C_f}\right) \qquad (4)$$

Note that if $f_p = f_w = 1$, Equations 1 and 4 reduce to:

$$\frac{C_{p(n)}}{C_f} = k^n + \frac{C_{p(\infty)}}{C_f} \qquad (5)$$

and $$\frac{C_{w(n)}}{C_f} = 2 - k^n - \frac{C_{p(\infty)}}{C_f} \qquad (6)$$

The values of $C_{p(\infty)}$ and $C_{w(\infty)}$ are readily determined from the equation for the ultimate distribution in batch zone refining. That this is so can be illustrated with the aid of Fig. 5 as follows: As the product and waste streams flow across the refiner, solute is taken from the product stream, carried up the refiner, and deposited in the waste stream. The amount of solute thus transferred per cycle decreases with increasing section number, $n$, because the concentration gradient along a given section increases with $n$. The positive slope of $C_{w(n)}$ curve at a given section in Fig. 5 is proportional to the amount of solute transferred along that section. As $n$ becomes large the slope becomes zero, indicating that solute is no longer being carried along the refiner by the zones. This condition (zero slope) corresponds to an ultimate batch distribution along the section. The equation of this distribution has been given by W. G. Pfann, Transactions AIME, 194, 747 (1952). It is:

$$C_{(x)} = Ae^{Bx} \qquad (7)$$

where $$k = \frac{Bl}{e^{Bl} - 1} \qquad (8)$$

Knowing (7) to be the distribution in the solid in the section $n = \infty$ (or at least very large), we obtain from it the following expressions for the liquid product and waste leaving this section:

$$C_{p(\infty)} = C(0)/k = A/k \qquad (9)$$

$$C_{w(\infty)} = C(L-l)/k = \frac{A}{k}e^{B(L-l)} = \epsilon C_{p(\infty)} \qquad (10)$$

where $$\epsilon = e^{B(L-l)}$$

From (9), (10) and (3) it is found that:

$$\frac{C_{p(\infty)}}{C_f} = \frac{f_p + f_w}{f_p + \epsilon f_w} \qquad (11)$$

For $f_p = f_w$, Equation 11 reduces to:

$$\frac{C_{p(\infty)}}{C_f} = \frac{2}{1 + \epsilon} \qquad (12)$$

Equations 1, 2, 4 and 11 comprise all that is needed to determine $C_{p(n)}$ and $C_{w(n)}$ for a refiner having any given number $n$ of sections. This is possible because, even though a refiner with a very large number of sections is assumed in deriving the equations, this condition is only needed to obtain $C_{p(\infty)}$ in Equation 1. For $n$ less than the number needed to closely approach the ultimate distribution, the equation for $C_{p(n)}$ is closely approximated by the simple exponential:

$$\frac{C_{p(n)}}{C_f} = G^n \qquad (13)$$

The effect of variations in flow conditions on the volumes and concentrations of waste and product are further discussed in connection with Fig. 15.

Figure 6:
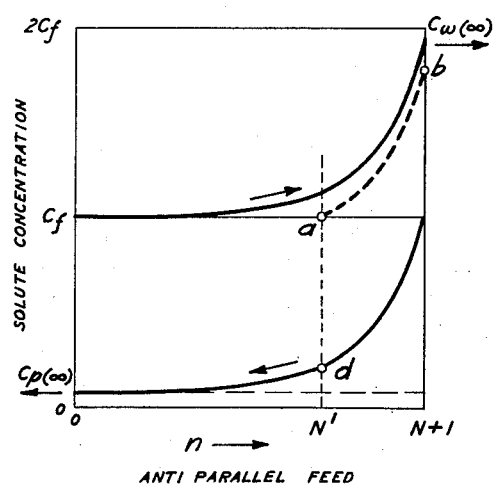
Fig. 6 is a similar plot showing the variation in solute concentration in the cross-flow direction for an anti-parallel feed operation.

The general form of the curves of $C_{p(n)}$ and $C_{w(n)}$ versus $n$ for an antiparallel flow cross-feed refiner operated as in Fig. 4 are shown in Fig. 6. The total number of sections, designated N, is large enough for the asymptotic limit of the $C_{p(n)}$ curve to be evident. The $C_{p(n)}$ curve is quite similar to that for parallel flow, but is reversed in position. The $C_{w(n)}$ curve is no longer symmetric but is parallel to the $C_{p(n)}$ curve, being a fixed distance above it on the vertical axis.

In the antiparallel case, for N large, a batch ultimate distribution, lying entirely below the $C_f$ ordinate, is obtained in the first section (left side of Fig. 6). For $f_p = f_w$, the waste concentration, $C_{w(\infty)}$, leaving at the right side of the refiner is greater than $C_t$ by an amount equal to that by which the exit product concentration $C_{p(\infty)}$, leaving at left side, is below $C_t$. This is evident from the solute balance, Equation 3 which is applicable here also.

Hence, the antiparallel mode is capable of providing a maximum separation twice the ultimate distribution for a batch refiner of equal length, which is about twice the separation attainable with the parallel mode.

The equation for $C_{p(n)}$ is:

$$\frac{C_{p(n)}}{C_f} = G^{(N-n+1)} + \frac{C_{p(\infty)}}{C_f} \qquad (14)$$

Where G is given by (2), N is the total number of sections, n is the section number, measured from the product exit, at the left, and $C_{p(n)}$ is the composition of the product leaving the nth section.

In a manner similar to that for the parallel mode, it is found that, for N large enough for $C_{p(n)}$ to become asymptotic to $C_{p(\infty)}$ (which is really $C_{p(1)}$), the exit concentrations are found to be:

$$\frac{C_{p(\infty)}}{C_f} = \frac{C_{p(1)}}{C_f} = \frac{1}{\epsilon} \qquad (15)$$

where $\epsilon = e^{B(L-l)}$, and:

$$\frac{C_{w(\infty)}}{C_f} = \frac{C_{w(N)}}{C_f} = \frac{f_p + f_w}{f_w} - \frac{f_p}{f_w} \cdot \frac{1}{\epsilon} \qquad (16)$$

which, for $f_p = f_w$, reduces to:

$$\frac{C_{w(\infty)}}{C_f} = 2 - \frac{1}{\epsilon} \qquad (17)$$

The overall separation, $C_{w(\infty)}/C_{p(\infty)}$ is, from (16) and (18), for $f_p = f_w$:

$$\frac{C_{w(\infty)}}{C_{p(\infty)}} = 2\epsilon - 1 \text{ (Antiparallel)} \qquad (18)$$

For the parallel mode, this ratio, for $f_p = f_w$ is:

$$\frac{C_{w(\infty)}}{C_{p(\infty)}} = \epsilon \qquad (19)$$

For refiners of substantial length, for example 5 or 10 zone lengths, the $C_{p(n)}$ curve in Fig. 6 is determined largely by the concentrations at the beginning of the refiner. For concentrations, $C_{p(n)}$, substantially greater than $C_{p(\infty)}$, this curve is given to a good approximation by:

$$C_{p(n)} \doteq G^{(N-n+1)} \qquad (20)$$

Equation 20 is also a good approximation for a refiner in which N is substantially less than the value needed for $C_{p(n)}$ to approach $C_{p(\infty)}$. For a refiner having a number of sections corresponding to (N—N') in Fig. 6, $C_{w(n)}$ can be obtained by the construction shown. Dashed curve ab is drawn parallel to the $C_{p(n)}$ curve beginning at a point a which is at the intersection of the $C_t$-horizontal and the N'-vertical. The exit waste concentration is given by point b and the exit product concentration by point d. These are equidistant from $C_t$ in the vertical dimension of Fig. 6.

Analysis of the steady state concentration distribution along the various sections of the refiner of Fig. 3 as plotted in Fig. 5 shows that in the lower-numbered sections there are substantial lengths near the beginning of the refiner in which the concentration gradient is negligibly small. Such flat regions are longest in the first section and decrease in length as n increases. Such considerations suggest the elimination of these regions from the refiner, thereby resulting in a decrease in material in process and in a decrease in the cost of apparatus and operation. The general form of such a variable length refiner as operated in the parallel mode is shown in Fig. 7.

Fig. 7 depicts a parallel mode variable length cross-flow refiner 100 having eight refiner sections 101 completely separated one from the other by partitions 102, except in the regions of orifices 103 and 104. Corresponding molten zones 105 are simultaneously produced in refiner sections 101 by heater 106 which is caused to rotate about center of revolution 107 so as to result in initial and terminal zonal positions 105A and 105B, respectively. The effect of such apparatus configuration is to result in an increasing rate of zonal traversal for succeeding refiner sections 101 from left to right in the figure and in effect to reduce the length of refiner sections 101 in terms of zone length from right to left. Aside from the distortion of zones 105 resulting during traversal, the operation of the refiner of Fig. 7 is identical with that of Fig. 3 with feed streams resulting from the introduction of such material at 107, the withdrawal of product at 108 at the beginning of the refiner, and the introduction of feed 109 and the withdrawal of waste 110 at the end of the refiner. The particular type of heater configuration and travel shown is illustrative only.

The effect of operating a refiner such as that shown in Fig. 7 and some indication of the permissible reduction in initial section lengths has been determined empirically as follows:

A parallel flow refiner of constant section length, having the following operating parameters, was run until the steady state was established: $L=10$, $l=1$, $n=7$, $f_p = f_w = 1$, $k=0.5$. It was found that the regions of negligible concentration gradient were eliminated by reducing the section lengths to the following values:

| Section number, n | 1 | 2 | 3 | 4 | 5 | 6 | 7 |
|---|---|---|---|---|---|---|---|
| Number of zone lengths in section | 4 | 5 | 6 | 7 | 8 | 9 | 10 |

Upon operating the modified refiner in the steady state, it was found that the separation obtained was, within 1 percent, equal to that obtained with the constant length refiner. Since the mean section length of the modified refiner was 7 zone lengths, the percentage reduction in area of refiner (and volume of holdup) is:

$$\frac{70-49}{70} \times 100 = 30\%$$

Fig. 8 depicts a variable length parallel section cross-flow refiner operated in the antiparallel mode. This refiner 120 contains eight refiner sections 111 separated one from the other by partitions 112 except for those portions in the vicinity of orifices 113 and 114. In operation molten zones 115 in corresponding positions in refiner sections 111 are produced and are caused to move by heater 116 which revolves about a center of revolution at 117 so as to result in initial zone positions 115A and terminal zone positions 115B. The feed-product stream enters the refiner at port 117 and proceeds from right to left leaving the refiner at port 118 at the initial position 115A of zones 115. Feed-to-waste flow at the terminal positions of molten zones 115 at 115B is from left to right entering the refiner at 119 and leaving at 120.

A procedure similar to that described in conjunction with Fig. 7 was used to empirically determine the effect of reducing section length for the antiparallel mode of cross-flow. It was found that the amount of reduction feasible for such mode was somewhat less than for the parallel mode. The following values were obtained for an antiparallel refiner which was within 1 percent equivalent to a constant length antiparallel refiner having the following operating parameters: $L=10$, $l=1$, $n=7$, $f_p = f_w = 1$, $k=0.5$.

| Section number, n | 1 | 2 | 3 | 4 | 5 | 6 | 7 |
|---|---|---|---|---|---|---|---|
| Number of zone lengths in section | 10 | 9½ | 8⅔ | 8 | 7⅓ | 6⅔ | 6 |

Variable section length cross-flow zone refining may conveniently be carried out in the annular type apparatus depicted schematically in Fig. 9. Such an apparatus inherently provides for reduction of refiner section length in the desired direction and also results in some reduction in heat loss, the amount of material maintained molten being constant at all times and being produced by the same heater area. Such apparatus is conveniently used for the treatment of higher melting materials where it is desirable to use an encompassing type heater structure such as heater 42 of Fig. 2.

The cross-flow zone refiner 130 of Fig. 9 contains seven refining sections 131 of concentric annular configuration each separated from the other by partitions 132 along their entirety, except for the positions corresponding with orifices 133 and 134, these orifices providing for material cross-flow in the manner described. Molten zones 135 are produced in the material within the refiner sections 131 by heater 136. Clockwise movement of heater 136 results in the corresponding movement of molten zones 135 having initial position 135A and terminal position 135B. For the parallel mode of feed cross-flow indicated, two streams are produced by introduction of feed material at positions 137 and 139 and removal of product and waste at positions 138 and 140, respectively. The refining operation depicted in this figure is in all ways equivalent to that described in conjunction with Fig. 7.

Fig. 10 depicts a cross-flow refining operation carried out in apparatus 150, of identical configuration to that of Fig. 9, such refiner 150 containing refining sections 151 separated by partitions 152 along their entirety, except for positions corresponding with orifices 153 and 154. Clockwise movement of heater 156 results in the creation and clockwise movement of molten zones 155, such zones having an initial position corresponding with orifices 153 at 155A and a terminal position at 155B corresponding with orifices 154. The mode of operation illustrated is antiparallel with feed entering through ports 157 and 160 and product and waste being withdrawn through ports 158 and 159, respectively. This operation is the equivalent of that described in conjunction with Fig. 8.

Although the cross-flow procedures have been described in terms of two-product withdrawal, these principles may be used effectively to separate ternary systems comprising, for example, a desired solvent plus two impurities, one having a distribution coefficient less than unity and the other solute having a distribution coefficient greater than unity.

Figure 11:
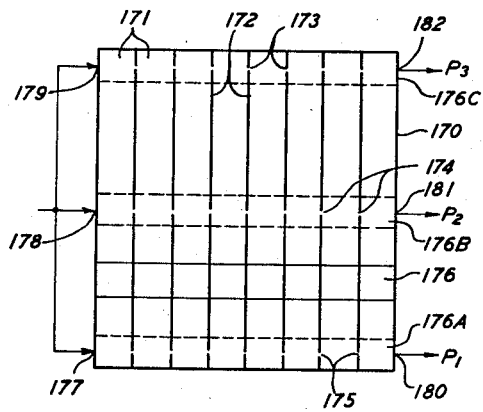
Fig. 11 is a schematic plan view showing three-product parallel feed flow in a cross-flow refiner.

A parallel flow refiner suited for this purpose is shown in Fig. 11. The refiner 170 depicted has five refining sections 171 separated one from the other by partitions 172 connected however by three series of orifices 173, 174 and 175. Molten zones 176 produced by means not shown within the material undergoing treatment are initially produced in position 176A and, with upward movement of the heater means, pass through position 176B ultimately attaining position 176C. In each of positions 176A, 176B and 176C there is introduced feed material through ports 177, 178 and 179, respectively, product material designated $P_1$, $P_2$ and $P_3$ being withdrawn through ports 180, 181 and 182, respectively.

Figure 12:
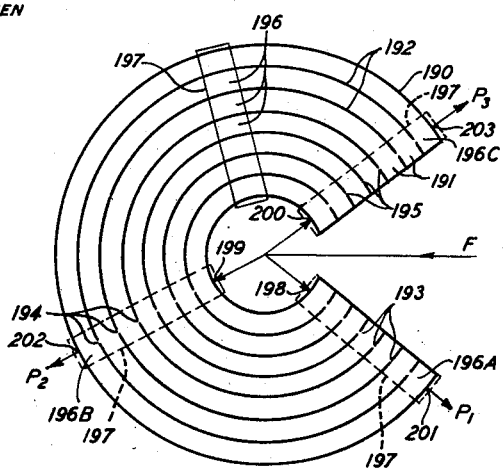
Fig. 12 is a schematic plan view showing such three-product withdrawal parallel feed flow in an annular refiner.

Fig. 12 depicts an annular configuration analogous to the straight line cross-flow refiner of Fig. 11. This refiner 190 consists of refiner sections 191 separated over their entirety by partitions 192 except in the vicinities of orifices 193, 194 and 195. Molten zones 196 are produced by rotating heater 197 having an initial position, 196A, an intermediate position, 196B, and a terminal position, 196C. Feed is introduced through ports 198, 199 and 200, thereby producing three parallel cross-flow streams through orifices 193, 194 and 195, respectively, and resulting in the withdrawal of products $P_1$ at position 201, $P_2$ at position 202 and $P_3$ at position 203.

Fig. 13 on coordinates of concentration against distance along the final refiner section, such as the righthand section 171 of Fig. 11, presents approximate curves for a three-product withdrawal parallel cross-flow refining operation such as that of Figs. 11 and 12. It is convenient to consider a feed consisting of solvent A, impurity B having a $k$ less than 1 and impurity C having a $k$ greater than 1. The solute concentration of both A and B in the feed is indicated by the solid horizontal line marked $C_f$, that of the solute B along the section by the solid curve marked $C_B$ and that of the solute C along the section by the dashed curve designated $C_C$. The single $C_f$ horizontal indicates equal amounts of solutes C and B in the feed composition. Note that the concentration of solute B is greater than the concentration of that solute in the feed at the end of the refiner, while the C concentration is greatest at the beginning. Therefore, either end product leaving the refiner is enriched in one solute or the other. By drawing off a product at an intermediate point along the length of the last section there is obtained a product $P_2$ weaker in both solute B and solute C than the feed. Withdrawal of product at any position along the final refiner section intermediate the two positions corresponding with the intersections of the $C_f$ horizontal and the $C_C$ and $C_B$ curves results in withdrawal of such a product containing a reduced amount of both solute B and C as compared with the feed composition. The position $C_1$ indicated on Fig. 13 represents a position corresponding with withdrawal of product material having equal concentrations of solute B and solute C.

The annular operation depicted in Fig. 12 is particularly useful for this purpose since it results in a minimization of feed holdup and apparatus cost for a given separation and combined product flow as discussed in conjunction with Figs. 7 through 10. Although Fig. 13 is premised on equal concentrations of solutes B and C in the feed composition, this is, of course, not necessary. It may be noted that as in the other refining operations described herein it is not required that the volume cross-flow be equal at each product position. Where solutes B and C are present only in trace amounts, the flow rates of products $P_1$ and $P_3$ are desirably small compared to that of $P_2$. Where, for example, B and C are present in amounts of 1 percent or less, product flows $P_1$ and $P_3$ are ideally of the order of about 2 percent of that of $P_2$. It may also be noted that position $X_1$ of Fig. 13 does not necessarily coincide with the center position in the last refining section. If, for example, solute C separates more easily than solute B, that is, has a greater absolute value of $(1-k)$, the $P_2$ exit is desirably nearer to the C-rich end of the refiner ($P_3$).

Figs. 14A and 14B depict a portion of a cross-flow refiner 210 containing six refining sections 211 of relatively large volume. Moving heater arm 212 having heated segments 213, one immersed in each of refining sections 211, results in moving molten zones 214 traversing solid material 215 undergoing treatment. Cross-flow is produced in the usual manner by introduction of feed material through two or more ports such as 215, product being withdrawn through ports such as port 217 at the opposite end of the refiner section bank. Staggering of orifices 218 reduces the likelihood of passage of material into, through, and out of a given section 211 during a single cycle.

Figs. 15 and 16 on coordinates of log $C_{p(n)}/C_f$ on the ordinate against section number from beginning to end of the refiner bank on the abscissa, are referred to in the illustrative calculations. In both of Figs. 15 and 16, equal values of $f_p$ and $f_w$ are assumed, although as is discussed herein this is not a general requirement of these processes. It may be generalized that a limiting concentration is reached in fewer sections as $f_p$ decreases from the value 1.0. However, this is achieved at the expense of volume throughput which, for a given section size (width), is proportional to $f_p$.

The relationship between $f_p$, $n$, and the total area of the refiner is such that, given a desired product composition $C_{p(n)}$ between $C_f$ and $C_{p(\infty)}$, and a desired volume flow of product (throughput), the minimum area of refiner that furnishes the composition and throughput desired contains a number of sections $n_{min}$, such that the desired throughput per cycle is equal to the volume of a zone in one section, i.e., such that $f_p=1.0$. Conversely where degree of separation and smallness of refiner are the main considerations, $f_p$'s less than unity are recommended, a range from about 0.01 to about 0.5 being useful.

Where the largest possible throughput is desired, an $f_p$ of unity is recommended. This provides greater product flow per unit area of refiner but requires a larger refiner than for operation in an $f_p$ range of less than unity. An exception to this statement occurs where $f_p$ is greater than 1, which can be achieved as described in the following paragraph:

An $f_p$ greater than 1 is achieved by injecting a volume greater than a zone volume for each cycle only by the effective diminution in the number of refining sections. The number of such sections may be effectively retained by increasing the zone lengths of material while in their crossflow positions and by transferring the total molten volume to the adjacent section. In this manner, an $f$ greater than 1 may be obtained.

Fig. 15 is utilized in illustrative calculations 1 and 2 which follow:

Illustrative calculation 1

Given a material to be separated, for which the mean distribution coefficient, $k$, of the impurity is 0.5 over the compositional range of interest. Given a desired purification ratio, $a=C_{p(n)}/C_f$ of 0.01, the required number $n$ of sections for parallel cross-flow operation at $f$=unity may be determined as follows:

From the semi-logarithmic plot of Fig. 15, which is for $k=0.5$, $L=9$, it is seen that the straight line portion of the $f=1$ curve intersects the 0.01 horizontal at 6.7. Hence the number of sections is taken as 7.

Illustrative calculation 2

Assuming the same feed composition and desired product and waste compositions, the number of refining sections where $f=0.2$ may be determined as follows: From the $f=0.2$ curve in Fig. 15, it is seen that the 0.01 horizontal corresponding with the desired purification ratio of $\alpha$ is intersected at $n=2.6$. Hence, three sections are needed. As compared with operation at $f=1$, the area of the refiner is 3/7 and the relative volume throughput is 1/5 for section widths which are the same as those for calculation 1.

Illustrative calculation 3

Assuming the same conditions as in illustrative calculations 1 and 2, the required number of refining sections for $f=2$ is determined as follows: From Fig. 15, it is seen that the $f=2$ curve intersects the 0.01 horizontal at 11.5 so that 12 sections are needed. The throughput is twice that for the $f=1$ operation of calculation and the area of the refiner is 12/7 of that of $f=1$ operation for sections of the same width.

The desired purification ratio $\alpha$ can be obtained with the refiner about 7 zone lengths long, for which $C_p(\infty)$ is still well below the 0.01 horizontal. If the required purification ratio approaches the $C_{p(x)}$ horizontal, the refiner becomes less efficient in terms of the purification per section in accordance with Equation 1, as indicated by the curved portion of the $f_p=0.2$ and the $f_p=0.5$ lines.

In similar manner, the type of plot shown in Fig. 15 may be used to determine the required number of section lengths for any throughput ratio $f_p$, for the anti-parallel mode of operation. Fig. 16 is based on equal throughput flows for a binary-flow antiparallel refining operation for a refiner having constant section lengths equal to 9 zone lengths as operated on a material containing a solute of concern having a distribution coefficient of 0.5. This is illustrated in the following calculation:

Illustrative calculation 4

The overall separation that can be achieved for $k=0.5$ in a cross-flow refiner having 10 sections and operated in the antiparallel mode is calculated as follows: From Fig. 16, we see that an $\alpha=C_{p1}/C_f$ of 0.001 can be obtained for $f_p=1$, the product leaving at the front of the first section. The abscissa, $n=11$, is really the feed point, at which $C_p=C_f=1$. In the parallel mode this point had the abscissa, $n=0$. Both figures apply to a refiner with 10 sections.)

For $f_p=f_w=1$, the relative exit waste concentration, $C_{w(N)}/C_f$ must equal $1+(1-C_{p1}/C_p)=2-0.001=2$. Hence, the overall separation, $C_{w(N)}/C_{p1}$ is:

$$\frac{C_{w(N)}}{C_{p(1)}} = \frac{2}{0.001} = 2000$$

The throughput fraction, $f$, is usually constant in refiners of constant section area. However, if the section width or the zone length varies from section to section, then $f$ varies, even though the actual volume flowing across the refiner is necessarily constant. For example, in the circular designs, if the section width is constant and the zone length remains a constant fraction of the section length, i.e., if the zone is sector-shaped, then $f$ decreases with increasing section number, as is evident when it is recalled that $f$ is the fraction of zone volume in a section that is transferred. This condition leads to a steeper curve of concentration versus section number.

In general, it is preferable to have a constant zone length in a circular form refiner in order to take advantage of the increasing section length provided by that design.

The construction of cross-flow refiners permits variations of $f$ as a function of $n$ simply by having the width of section vary across the refiner. Such practice may be desirable under certain circumstances but, in general, most efficient operation is obtained with constant $f$. None of the designs is limited to one set of zone heaters per refiner. Passing more than one zone along a section, between feed injecting steps, has an effect on the separation similar to reducing $f$ in the given section.

Certain simplifying assumptions have been made in the description of this invention. It should, however, be kept in mind that the processes described are broadly zone-melting procedures in which material flows have been superimposed. As such, the processes herein are applicable to the entire range of materials to which batch zone-melting is applicable including all fusible materials, that is, all materials wihch may be caused to undergo a phase transformation from solid to liquid and back to solid. Such processes are advantageously practiced in the treatment of any such material containing one or more solutes having a distribution coefficient differing from unity in the system under consideration. As indicated above, such distribution coefficient may advantageously be enhanced by the addition of a component material which may be considered to act as an added solvent.

Although, for simplicity, all processes depicted in the figures make use of but a single bank of molten zones at a given stage in the process, further efficiency in point of time may, of course, be realized by the use of additional banks of such zones moving in the same direction. Although such zones are conveniently produced by the use of a single heater extending across the total width of the refiner in the cross-flow direction, this is not a general requirement of the processes herein. To ensure such port-to-port liquid cross-flow, it is required only that material undergoing treatment be simultaneously molten at the positions of both ports and all orifices at a given cross-flow position. There is no general requirement that such molten zones correspond in position from refining section to refining section intermediate such cross-flow positions. In fact, the alternate operation described above provides for continuous cross-flow between feed and corresponding product port positions. It is not required that there be an equal number of molten zones in each section at any given time nor it is required that there be even a single such moving zone at all times in each section.

Other methods of material cross-flow suitable for the practice of this invention include movement of solid material from section to section as by use of a conveyor belt. Such solid material movement may conveniently occur with the zones a fraction or entirety of a zone length removed from the concerned position in the refiner. Other types of liquid cross-flow include stepwise draining from product or waste section to feed section to minimize objectionable mixing during withdrawal. Other modes of liquid movement include transfer from section to section by means of ladles. Such an alternate method obviates the use of orifices and assures plug-like flow.

The subject of this invention relates to continuous zone-melting procedures herein designated as cross-flow processes. All figures and descriptions insofar as they relate to suitable apparatus are to be considered as exemplary only. Suitable variations on the apparatus shown are immediately apparent. For example, although corresponding zones are conveniently separated by infusible partitions under the processing conditions, separation between adjoining refiner sections, which is all that is required for the purposes of this invention, may be produced by maintaining selected portions of the material undergoing treatment solid, or by staggering the moving molten zones from section to section so as to prevent molten phase mixing between adjacent sections.

The most convenient type of apparatus useful for the purposes herein is of the form generally described, that is, a single receptacle divided into separate refining sections by solid partitions and in which cross-flow is produced through orifices which are simultaneously in contact with molten material during cross-flow. These processes may readily be carried out in other types of apparatus such as, for example, in separate, parallel boats of the type generally used in batch refining operations which are connected with tubes at cross-flow positions. Although in analogy to the apparatus depicted, such boats may be kept on a common horizontal plane, differences in elevation may be utilized to effect gravity cross-flow. Such gravity cross-flow may conveniently be carried out also on any of the straight line apparatus shown by considering such apparatus to be on a sloped or vertical plane with each successive refining section at a lower level. Such gravity cross-flow may be used for both or all product flows where the mode of operation is parallel. The use of enclosed apparatus and/or of protective atmospheric gases, or vacuum operation, may or may not be required in accordance with the reactivity and other conditions of the material both before and after treatment. The necessity for such operation is determined accordingly.

What is claimed is:
1. A zone-melting method for redistributing the ingredients of a fusible material containing at least one solute having a liquid-solid distribution coefficient which differs from unity in such material, comprising establishing in a solid phase of the said fusible material at least two moving molten zones having distinct paths of traversal, and establishing at at least two positions along the said traversal paths a material transfer path transverse to the said traversal paths, the relationship between traversal paths and transfer paths being such that the said at least two molten zones move unidirectionally with respect to the said transfer paths, introducing feed material of the system undergoing treatment at an end of each of the said material transfer paths and withdrawing treated material from the opposite end of each of the said material transfer paths.

2. The method of claim 1 in which the said material transfer paths are liquid.

3. The method of claim 1 in which the said traversal paths are separated by partitions over a substantial portion of the length of the said traversal paths, which partitions are infusible under the operating conditions of the said method.

4. The method of claim 1 in which the said traversal paths are essentially linear.

5. The method of claim 1 in which the said traversal paths essentially define arcs with a common center of revolution.

6. The method of claim 1 in which material transfer paths are established at three positions along the said traversal paths.

7. The method of claim 2 in which each transfer path is liquid over its entirety for at least a portion of each cycle.

8. The method of claim 2 in which the said transfer path is maintained liquid during an entire cycle.

9. The method of claim 2 in which the amount of feed introduced and the amount of treated material withdrawn are equal.

10. The method of claim 2 in which material transfer is in a single direction in all transfer paths with respect to the said traversal paths.

11. The method of claim 2 in which material transfer is in opposing direction in successive transfer paths with respect to the said traversal paths.

12. The method of claim 10 in which the length of each successive traversal path increases in the direction of purified solvent withdrawal.

13. The method of claim 11 in which the length of each successive traversal path increases in the direction of purified solvent withdrawal.

References Cited in the file of this patent

Nelson: "Transistor I," R.C.A. Laboratories, March 1956, pp. 66 to 69.